United States Patent
Tumavitch et al.

(10) Patent No.: US 9,423,024 B2
(45) Date of Patent: Aug. 23, 2016

(54) RAPID SYNCHRONIZER TOUCH POINT ADJUSTMENT

(75) Inventors: Jeffrey J. Tumavitch, Lovonia, MI (US); Shawn A. Holland, Livonia, MI (US); Bradley D. Riedle, Northville, MI (US); William L. Murray, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 871 days.

(21) Appl. No.: 13/348,758

(22) Filed: Jan. 12, 2012

(65) Prior Publication Data
US 2013/0184945 A1 Jul. 18, 2013

(51) Int. Cl.
*F16H 61/26* (2006.01)
*F16H 61/28* (2006.01)

(52) U.S. Cl.
CPC ........ *F16H 61/28* (2013.01); *F16H 2061/2823* (2013.01); *F16H 2061/2869* (2013.01); *F16H 2342/042* (2013.01)

(58) Field of Classification Search
CPC ............ F16H 61/28; F16H 2061/2869; F16H 2342/042; F16H 2061/2823
USPC ...................... 701/51; 74/333, 335
See application file for complete search history.

(56) References Cited

U.S. PATENT DOCUMENTS

| | | | |
|---|---|---|---|
| 4,911,031 A | 3/1990 | Yoshimura et al. | |
| 5,219,391 A | 6/1993 | Edelen et al. | |
| 5,305,240 A * | 4/1994 | Davis et al. | 702/95 |
| 5,390,599 A * | 2/1995 | Matsumoto et al. | 101/226 |
| 5,458,014 A * | 10/1995 | Thomas et al. | 74/325 |
| 5,526,709 A * | 6/1996 | Thomas et al. | 74/325 |
| 6,164,149 A * | 12/2000 | Ohmori et al. | 74/336 R |
| 6,481,304 B1 * | 11/2002 | Yoshioka et al. | 74/335 |
| 6,499,372 B2 * | 12/2002 | Rogg | 74/335 |
| 6,681,650 B2 | 1/2004 | Yoshioka et al. | |
| 6,785,599 B2 * | 8/2004 | Berger et al. | 701/51 |
| 7,222,552 B2 * | 5/2007 | Kouno et al. | 74/336 R |
| 7,845,247 B2 * | 12/2010 | Olds et al. | 74/333 |
| 8,117,935 B2 * | 2/2012 | Diemer et al. | 74/335 |
| 8,151,662 B2 * | 4/2012 | Fitzgerald et al. | 74/330 |
| 2003/0041683 A1 * | 3/2003 | Jager et al. | 74/335 |
| 2009/0306864 A1 * | 12/2009 | Tamori | 701/51 |
| 2012/0168274 A1 * | 7/2012 | Mills | 192/85.63 |

* cited by examiner

*Primary Examiner* — Anne M Antonucci
(74) *Attorney, Agent, or Firm* — James Dottavio; MacMillan, Sobanski & Todd, LLC

(57) ABSTRACT

A method of adapting transmission controls to locate synchronizer touch points in an automated layshaft transmission. This method may include actuating a motor to move a shift drum along a layshaft at an essentially constant speed; measuring a feedback current as the motor moves the shift drum; detecting a first spike in feedback current adjacent to a second spike in feedback current for a gear; determining a shift drum angle for the first spike; and adjusting a transmission controller to set a synchronizer touch point at a shift drum angle adjacent to the first feedback current spike for the gear.

5 Claims, 3 Drawing Sheets

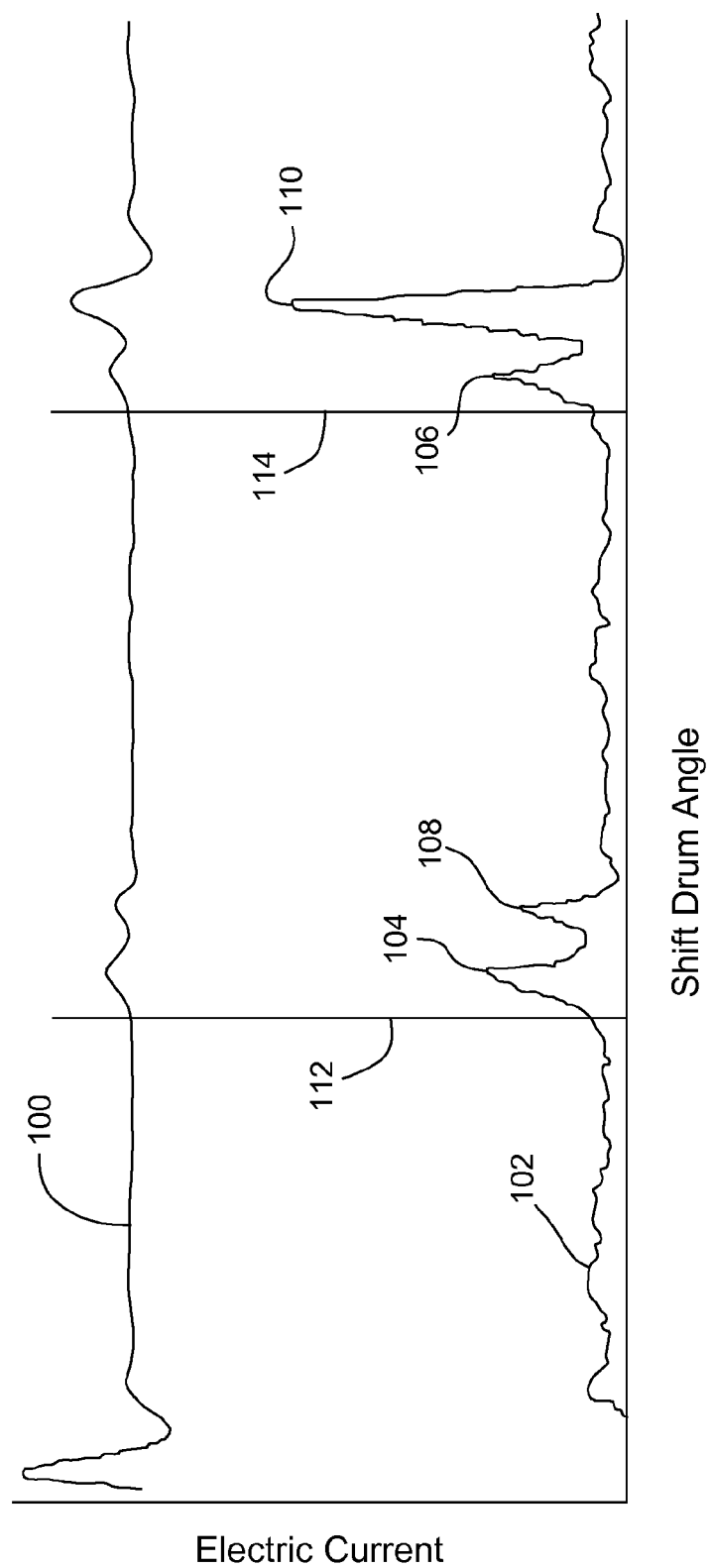

RAPID SYNCHRONIZER TOUCH POINT ADJUSTMENT

BACKGROUND OF INVENTION

The present invention relates to an automatically shifted layshaft transmission, and more particularly to a method for making adjustments to a synchronizer actuation mechanism in such a transmission.

Some automatically shifting transmissions employ dual clutches and layshafts. For each of the two layshafts, an electric motor rotates a shift drum through various positions, causing shift forks to actuate synchronizers attached to the corresponding gearing. When the shift drum is in an appropriate position, the layshafts may carry torque through the application of a corresponding automatically actuated clutch.

In order to increase shifting speed and decrease transmission noise it is important to know at what shift drum rotation angle the synchronizer begins to transfer torque. Unfortunately, the typical transmission tolerance stack-up may have a relatively large tolerance band around the expected position. This makes increases in shifting speed and decreases in noise difficult.

As a result, some have tried to apply an adaptive algorithm to account for the tolerances, but such algorithms tend to be slow and exhibit larger than desired variability. One adaptive algorithm uses the change in speed across the synchronizer during shifts to infer the shift drum position where torque capacity is achieved. However, such an approach is susceptible to noise factors such as road conditions, driving styles and part-to-part variability. Also, since the speed change across a synchronizer is strongly influenced by the overall control of the transmission, any design change may require a time-intensive recalibration of the adaptive routine as well.

SUMMARY OF INVENTION

An embodiment contemplates a method of adapting transmission controls to locate synchronizer touch points in an automated layshaft transmission comprising the steps of: actuating a motor to move a shift drum along a layshaft at an essentially constant speed; measuring a feedback current as the motor moves the shift drum; detecting a first spike in feedback current adjacent to a second spike in feedback current for a gear; determining a shift drum angle for the first spike; and adjusting a transmission controller to set a synchronizer touch point at a shift drum angle adjacent to the first feedback current spike for the gear.

An advantage of an embodiment is that transmission calibration and testing can be accomplished quickly, with accurate locating of the synchronizer locations. Such testing can be used at the end of a transmission assembly line to quickly and accurately set the shift drum positions that correspond to the synchronizer locations.

BRIEF DESCRIPTION OF DRAWINGS

FIG. 5 is a graph schematically illustrating a shift drum angle on a horizontal axis and an electric current on the vertical axis.

DETAILED DESCRIPTION

Figure 1:
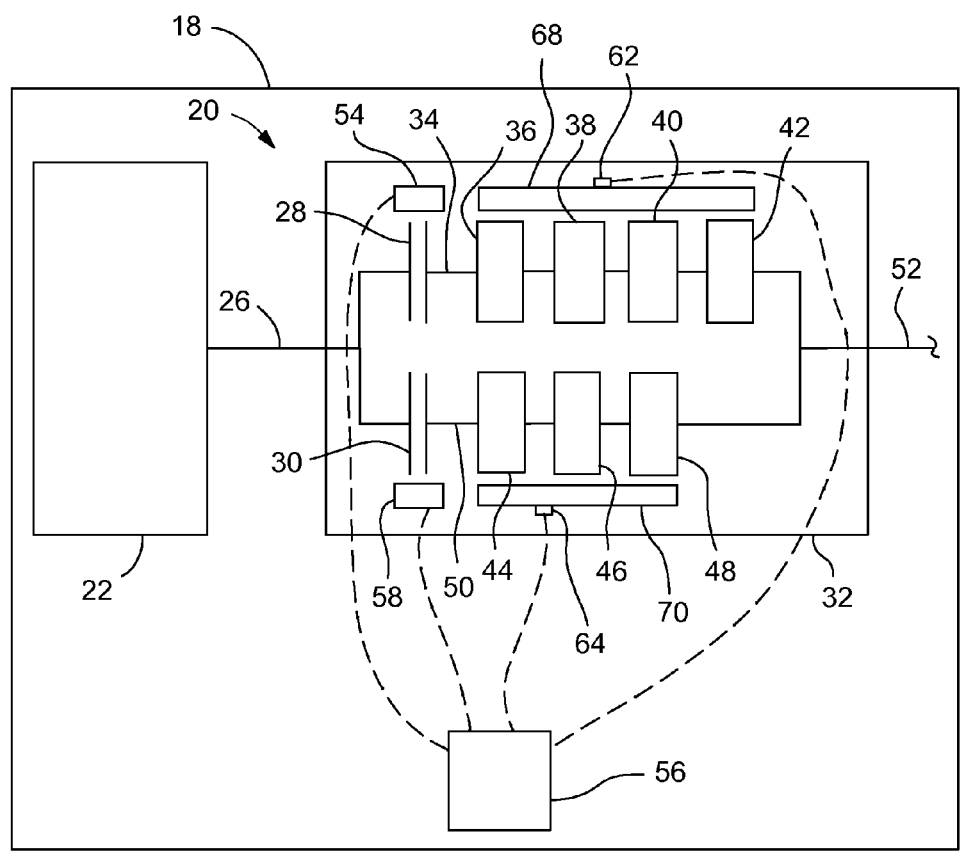
FIG. 1 is a schematic, view of a portion of a vehicle drive train.

FIG. 1 illustrates a portion of a vehicle 18, having a vehicle powertrain 20 that includes an engine 22, with an engine output shaft 26. The engine 22 may be a conventional gasoline or diesel engine, or some other type of engine if so desired. The output shaft 26 splits in two and is coupled to a first clutch 28 and a second clutch 30. The first and second clutches 28, 30 are preferably dry clutches but may also be wet clutches instead, and may be located within an automated transmission 32 or adjacent to the transmission 32. The transmission includes a transmission output shaft 52 that connects to the rest of the powertrain 20, which may be a rear wheel drive arrangement or a front wheel drive arrangement.

While the transmission 32 is one that shifts automatically, the transmission 32 is a type that has gear sets similar to those of a conventional manual transmission (having a layshaft) rather than gear sets similar to those of a conventional automatic transmission (typically planetary gear sets). The transmission 32 is also preferably configured as a powershift transmission in which the odd numbered gear ratios—a first gear 36, a third gear 38, a fifth gear 40, and possibly a reverse gear 42—are driven via an output 34 from the first clutch 28; and the even numbered gear ratios—a second gear 44, a fourth gear 46, and a sixth gear 48—are driven via an output 50 from the second clutch 30. When the transmission 32 is operating in one of the odd gears, the first clutch 28 is engaged and the second clutch 30 is disengaged, which allows for even numbered gear shifting. Then, the first clutch 28 is disengaged while the second clutch 30 is engaged so the transmission 32 is now operating in one of the even numbered gears. Accordingly, this arrangement allows for torque delivery through the transmission 32 to the transmission output shaft 52 even during automated shifting.

While the powertrain 20 employs a powershift transmission 32, the present invention may also be applied to other types of automated transmissions, such as, for example, automated manual transmissions with a single automatically actuated clutch.

Through electronically controlled actuators, the engagement and disengagement of the first and second clutches 28, 30, as well as shifting of the gears, is automated. A first clutch actuator 54 regulates the first clutch 28 and is electronically controlled by a transmission control unit 56, and a second clutch actuator 58 regulates the second clutch 30 and is also electronically controlled by the transmission control unit 56. The dashed lines in FIG. 1 indicates electric or other types of communication between components.

A first gear actuation assembly 68, including a first motor 62, manipulates the odd and reverse gears 36, 38, 40, 42, and a second gear actuation assembly 70, including a second motor 64, manipulates the even gears 44, 46, 48, with both being controlled by the transmission control unit 56.

Figure 2:
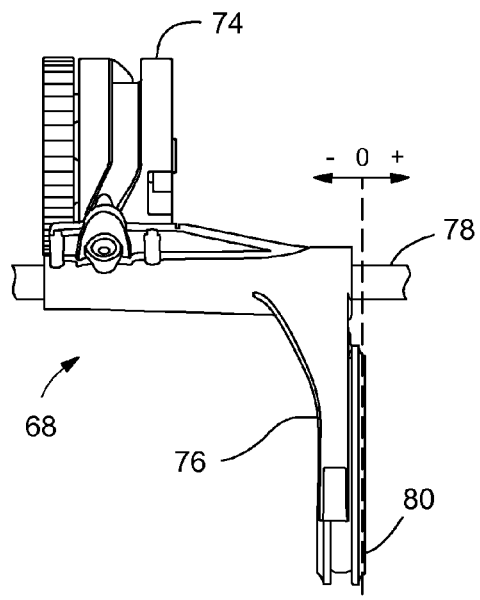
FIG. 2 is a schematic, side view of a portion of a transmission.
Figure 3:
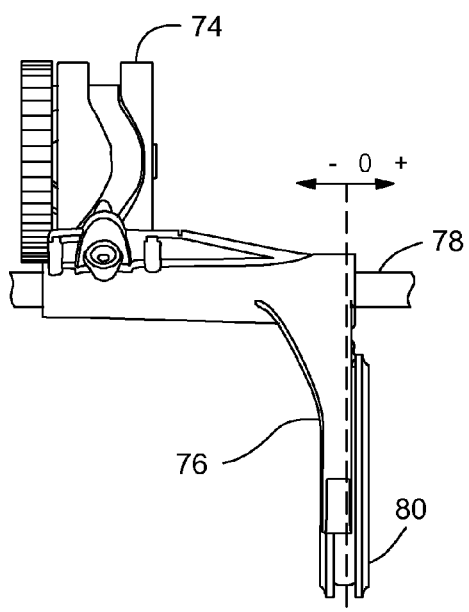
FIG. 3 is a schematic, side view of a portion of a transmission.
Figure 4:
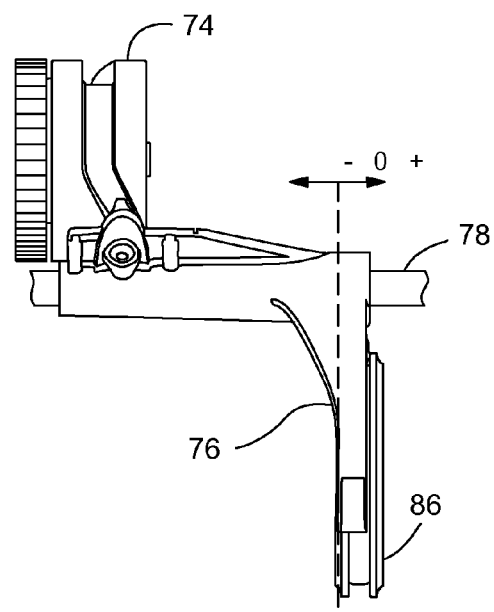
FIG. 4 is a schematic, side view of a portion of a transmission.

FIGS. 2-4 illustrate portions of gear actuation assemblies (68 or 70 in FIG. 1). In FIG. 2, a shift drum 74, which is part of the first gear actuation assembly 68 (shown in FIG. 1), is part of a fifth gear assembly for engaging and disengaging the fifth gear 40 (shown in FIG. 1). The shift drum 74 engages and selectively moves an associated shift fork 76 back and forth longitudinally along a layshaft 78 to cause engagement and disengagement of the shift fork 76 with a synchronizer 80. The zero position indicates a nominal shift fork position about which the shift fork 76 may be adjusted in the plus or minus direction along the layshaft to account for tolerances and other variances between individual assemblies. In the example of FIG. 2, the shift fork position has been corrected in the negative direction to account for assembly tolerances and shows the shift fork 76 in an engaged position with the synchronizer 80.

In the example of FIG. 3, a shift drum 74 has been calibrated to adjust the shift fork 76 along the layshaft 78 to a different corrected position relative to the synchronizer 80 in order to correct for a different assembly tolerance, which may occur in a different transmission or on a different gear assembly in the same transmission.

In the example of FIG. 4, the shift drum 74 is also part of a first gear assembly for engaging and disengaging the first gear 36 (shown in FIG. 1). The shift drum 74 engages and selectively moves the associated shift fork 76 back and forth longitudinally along the layshaft 78 to cause engagement and disengagement of the shift fork 76 with a synchronizer 86. The zero position indicates a nominal shift fork position about which the shift fork 76 may be adjusted in the plus or minus direction along the layshaft to account for tolerances and other variances between individual assemblies. In the example of FIG. 4, the shift fork position has been corrected in the positive direction to account for assembly tolerances and shows the shift fork 76 in an engaged position with the synchronizer 86.

For the automated layshaft transmission 32 shown in FIGS. 1-4, in order to increase shifting speed while maintaining minimum shifting noise it is desired to know at what shift drum rotation angle the particular synchronizer begins to transmit torque for each gear. The difficulty in precisely knowing the angle is that the expected positions are not always the true positions due to the tolerances of the transmission components. By determining the actual positions for each transmission (including tolerances of components in the assembly) the increased shifting speed with minimum shifting noise can be obtained.

A method of conducting end of assembly line testing when the automated layshaft transmission is manufactured (or later testing should a transmission be repaired) to determine the shift drum rotation angle for which the particular synchronizer begins to transmit torque allows for the smooth shifting. In a layshaft transmission, as the shift drum position is rotated from a neutral position towards a gear, it goes through several phases, a neutral phase where there is no contact and thus no torque transfer, synchronization, where the friction material is applied to begin torque transfer, and engagement, where there is zero speed across a synchronizer and a sleeve is locked to the particular gear.

A method for adapting transmission controls to accurately locate synchronizer touch points in the automated layshaft transmission may include actuating the motor 62, causing the rotation of the shift drum 74 through various positions as the shift drum 74 moves from one end of the layshaft 78 to the other (from end stop to end stop) at an essentially constant speed. As the shift drum 74 moves, the shift fork 76 will actuate the synchronizers (for example 86 and 80) as it passes each one. As the shift fork 76 engages the various synchronizers, the particular rotation angle at which torque begins to be transmitted is determined. The transmission control unit 56 then adjusts the shifting routine to account for the differences in shift points relative to the expected location, which accounts for tolerances in the transmission 32. The other shift drum, if there is one in the particular transmission, may also be taken through the same procedure to account for the tolerances in the assembly related to the other layshaft.

The particular angle at which the torque begins to be transmitted may be determined by controlling the motors 62, 64 in a feedback fashion using measured current of the feedback. The way this is determined is illustrated schematically in FIG. 5, which schematically illustrates a shift drum angle on the horizontal axis and an electric current on the vertical axis. A line representing the current of commanded pulse width modulation to the shift drum motor is indicated as element 100, and a line representing the feedback current is labeled as element 102.

The feedback current is analyzed to detect the positions of contact between the sleeve/blocker ring and the sleeve/speed gear (portions of the second gear actuator assembly 70 and the particular gear 44, 46 or 48). The positions of contact between the sleeve/blocker ring create a first spike in current, labeled 104 and 106. The positions of contact between the sleeve/speed gear create a second adjacent spike in current, labeled 108 and 110. From this, the transmission control unit determines the shift drum angle at which toque begins to be transmitted for each gear, which is adjacent and just prior to each pair of current spikes. In the schematic example shown in FIG. 5, the drum rotation angle 112 represents the position for the second gear engagement (one of the synchronizer touch points) and drum rotation angle 114 represents the position for the fourth gear engagement (another synchronizer touch point). As far as how much in front of the current spikes the engagement is determined to be, this depends upon and will vary based on the particular model of transmission, and so is determined separately for each model of transmission to which this procedure is applied.

Also, while only two pairs of current spikes are shown in the exemplary graph, the pairs of current spikes matches the number of gears on the particular layshaft. For example, if the particular layshaft has four corresponding gears associated with it, then the number of current spike pairs would be four. In a two layshaft, dual clutch type of transmission arrangement each layshaft would have the number of feedback current spikes as there are gears associated with that particular layshaft. For example, if a six speed transmission, then each layshaft would have three pairs of current feedback spikes that correspond to the three forward gears on each layshaft, with one layshaft having an additional pair of feedback current spikes for a reverse gear (if the transmission is so configured).

Thus, the adjustment to account for tolerances can be made quickly in single passes of the shift drums on the layshafts. In addition, if so desired, the method can be run on a transmission after extensive use to account for wear of the components.

While certain embodiments of the present invention have been described in detail, those familiar with the art to which this invention relates will recognize various alternative designs and embodiments for practicing the invention as defined by the following claims.

What is claimed is:

1. A method of adapting transmission controls to locate synchronizer touch points in an automated layshaft transmission comprising the steps of:
   (a) actuating a motor to move a shift drum along a layshaft at an essentially constant speed;
   (b) measuring a feedback current as the motor moves the shift drum;
   (c) detecting a first spike in feedback current adjacent to a second spike in feedback current for a gear;
   (d) determining a shift drum angle for the first spike; and (e) adjusting a transmission controller to set a synchronizer touch point at a shift drum angle adjacent to the first feedback current spike for the gear.

2. The method of claim 1 further including the steps of:
(f) actuating a second motor to move a second shift drum along a second layshaft at an essentially constant speed;
(g) measuring feedback current as the second motor moves the second shift drum;
(h) detecting a third spike in feedback current adjacent to a fourth spike in feedback current for a second gear;
(i) determining a shift drum angle for the second shift drum for the third spike; and
(j) adjusting the transmission controller to set a second synchronizer touch point at a shift drum angle adjacent to the third feedback current spike for the second gear.

3. The method of claim 2 further including the steps of:
(k) as the shift drum moves along the layshaft, detecting a fifth spike in feedback current adjacent to a sixth spike in feedback current adjacent to a third gear;
(l) determining a shift drum angle for the shift drum for the fifth spike; and
(m) adjusting the transmission controller to set a third synchronizer touch point at a shift drum angle adjacent to the fifth current spike for the third gear.

4. The method of claim 1 further including the steps of:
(f) as the shift drum moves along the layshaft, detecting a third spike in feedback current adjacent to a fourth spike in feedback current adjacent to a second gear;
(g) determining a shift drum angle for the shift drum for the third spike; and
(h) adjusting the transmission controller to set a second synchronizer touch point at a shift drum angle adjacent to the third current spike for the second gear.

5. The method of claim 4 further including the steps of:
(i) as the shift drum moves along the layshaft, detecting a fifth spike in feedback current adjacent to a sixth spike in feedback current adjacent to a third gear;
(j) determining a shift drum angle for the shift drum for the fifth spike; and
(k) adjusting the transmission controller to set a third synchronizer touch point at a shift drum angle adjacent to the third current spike for the second gear.

\* \* \* \* \*